United States Patent

[11] 3,603,613

[72] Inventor Hans Erdmann
Neu Isenburg II, Germany
[21] Appl. No. 839,257
[22] Filed July 7, 1969
[45] Patented Sept. 7, 1971
[73] Assignee International Telephone and Telegraph Corporation
New York, N.Y.
[32] Priority July 26, 1968
[33] Germany
[31] P 17 80 049.6

[54] VEHICLE LEVEL CONTROL
5 Claims, 4 Drawing Figs.
[52] U.S. Cl................................................. 280/124, 267/65
[51] Int. Cl..................................................... B60g 17/04
[50] Field of Search............................................ 280/124; 267/64, 65

[56] References Cited
UNITED STATES PATENTS
2,967,065  1/1961  Schwendner.................  280/124
3,063,734  11/1962  Davies..........................  280/124

Primary Examiner—Philip Goodman
Attorneys—C. Cornell Remsen, Jr., Walter J. Baum and Paul W. Hemminger ABSTRACT: A vehicle level control system for vehicles in which fluid pressure springs on each side of an axle are connected in parallel to a supply conduit for raising the vehicle and in parallel to a discharge conduit for lowering the vehicle. A check valve system in the parallel conduits prevents cross flow between the fluid pressure springs to stabilize the vehicle. The fluid flow is controlled by a level regulator to maintain a preset road clearance.

PATENTED SEP 7 1971  3,603,613

Inventor
Hans Erdmann

By Gerhard L Pasgrube
Agent

VEHICLE LEVEL CONTROL

BACKGROUND OF THE INVENTION

1. Field of the Invention

This invention relates to level controlling devices for motor vehicles and particularly to fluid-actuated level-controlling devices having a stabilizer to limit lateral inclination of the vehicle.

2. Description of the Prior Art

Level-controlling devices for automobiles which maintain the road clearance at a relatively constant level during operation under varying loads are known. One known level-controlling device includes a single level controller which controls the fluid pressure in two fluid pressure springs acting between an axle and the body of the vehicle. In this system the fluid pressure springs are parallelly connected and cross flow from one spring to the other can occur, causing instability or drift in the suspension of the vehicle body. This instability may be minimized by the installation of a stabilizing spring which connects the suspension systems of the two wheels but this involves additional expense and therefore this system is not desirable.

Another difficulty with the prior devices is that the increased load on the outside wheel during cornering tends to cause the vehicle body to tilt downward at the outside. Mechanical stabilizers which limit the inclination of the vehicle body on cornering are well known but such mechanical stabilizers are generally extremely complicated and bulky and therefore not practical for use on most motor vehicles. Consequently, stabilizers are not in wide use on automotive vehicles.

German Pat. No. 1,117,411 discloses an air spring system having a single conduit connecting a regulating valve to a pair of air springs. A distributor valve assembly having differential pressure springs is designed to prevent cross flow between the air springs. However, since there is a single conduit for supply and discharge a sudden increase in the pressure in one air spring, as might be caused by a vigorous shock, could cause a flow from one spring, through the common conduit, to the inlet conduit of the other air spring. Another disadvantage of this system is that the pressure differential necessary to raise or lower the vehicle must be sufficiently high to overcome the loading on the differential pressure springs. This requires a more expensive pump than would otherwise be necessary.

SUMMARY OF THE INVENTION

It is one object of this invention to provide a level-controlling device for automobiles in which cross flow of fluid between the fluid pressure springs is avoided under all conditions.

It is a further object of this invention to provide a level-controlling device for automobiles in which cross flow between fluid pressure springs is impossible and in which the pressure differential to raise or lower the vehicle body is minimized.

It is a further object of this invention to provide a simple, inexpensive hydraulic system for controlling the level of a vehicle and for stabilizing the vehicle during cornering.

The present invention accomplishes these objectives by the use of check valves which allow the flow of fluid from the pressure regulator to each of the fluid pressure springs and from the fluid pressure springs to the pressure regulator without allowing cross flow between the springs under any operating conditions.

DESCRIPTION OF THE PREFERRED EMBODIMENT

Figure 1:
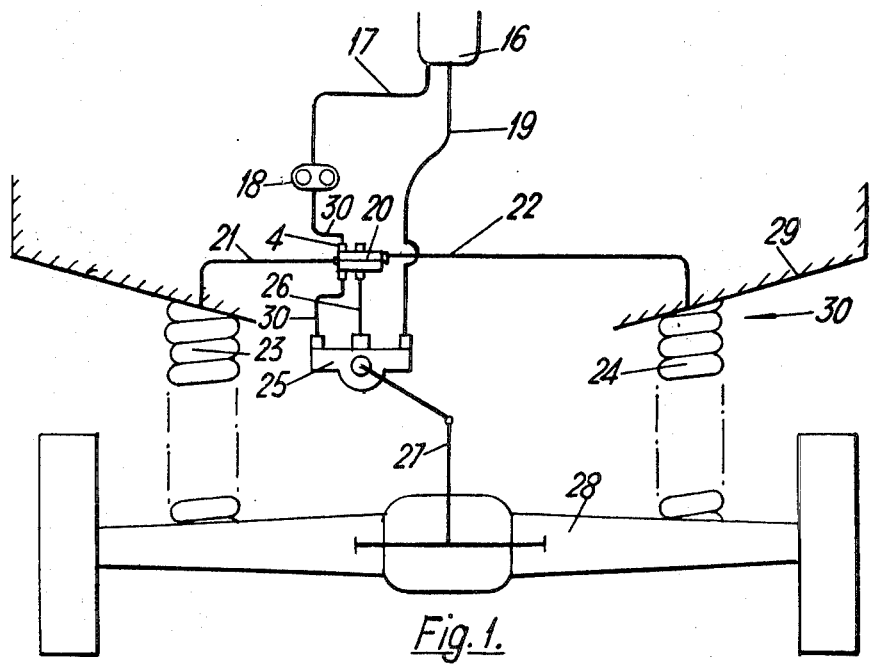
FIG. 1 is a schematic showing a level-controlling and stabilizing system of the present invention connected to the rear axle of an automobile.

FIG. 1 shows a level controlling and stabilizing system connected to the rear axle 28 of an automobile 30 having a vehicle body 29. Two fluid pressure springs 23 and 24 are arranged on the two sides of the rear axle 28 to support the vehicle body 29. Fluid under a controlled pressure is provided for the fluid pressure springs 23 and 24 by means of a system including a reservoir 16, pump 18, stabilizer 20 and level regulator 25. The reservoir 16, pump 18 and level regulator 25 form a closed loop via conduits 17, 30 and 19.

The level regulator 25 throttles the pump discharge to maintain a regulated pressure downstream of the pump and controls the flow in discharge conduit 26. A linkage 27 connected between the axle 28 and the level regulator 25 provides an input to the level regulator in response to the clearance height between the vehicle and the ground. When the vehicle is heavily loaded and the clearance height is reduced, the motion of the linkage 27 causes the level regulator to increase the regulated pressure in conduit 30. The increased regulated pressure causes a flow into the fluid pressure springs thereby raising the vehicle body. As the vehicle body moves upward, the linkage 27 causes the level regulator to reduce the regulated pressure until an equilibrium position is reached. Similarly, when the vehicle is lightly loaded, the level regulator will cause a flow of fluid from the fluid pressure springs via discharge conduit 26 thereby reducing the ground clearance.

The stabilizer 20 comprises four check valves 8, 9, 10 and 11 which do not operate as loading valves and which have extremely light springs 32, 34, 36, 38 holding these valves in the closed position. The valves are connected in a circuit corresponding to an electrical bridge circuit so that the flow of fluid from one fluid pressure spring to the other is prevented. Supply chamber 2 in the stabilizer housing 1 is connected to the supply conduit 30 while chamber 3 is connected to the discharge conduit 26. Chamber 5 is connected to fluid pressure spring 23 via conduit 21 and chamber 6 is connected to the fluid pressure spring 24 via conduit 22. Check valves 8 and 9 allow unrestricted flow from supply conduit 30 and chamber 2 to each of the fluid pressure springs while the check valves 10 and 11 allow unrestricted flow from the fluid pressure springs to chamber 3 and discharge conduit 26. Under no circumstances, will there be flow from one fluid pressure spring to the other.

When the ground clearance is reduced, the regulated pressure is increased and there will be parallel flow from the chamber 2 to the fluid pressure springs via check valves 8 and 9, chambers 5 and 6 and conduits 21 and 22 to raise the vehicle. Similarly, when the ground clearance is decreased, there will be parallel flow from the fluid pressure springs to the pressure regulator via check valves 10 and 11, chamber 3 and discharge conduit 26.

Figure 2:
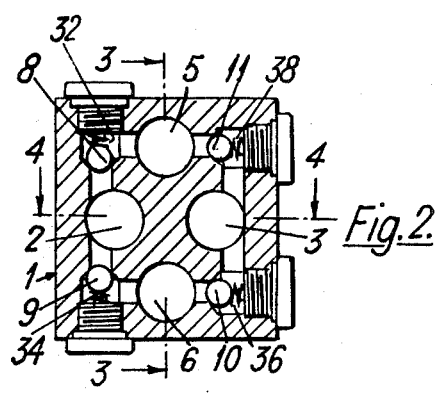
FIG. 2 is a cross-sectional view of the stabilizer shown in FIG. 1.
Figure 3:
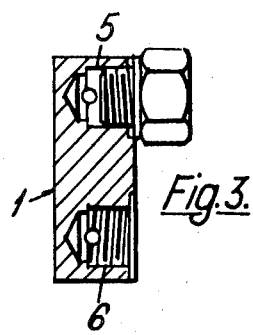
FIG. 3 is a section taken on the plane indicated by line 3—3 of FIG. 2.
Figure 4:
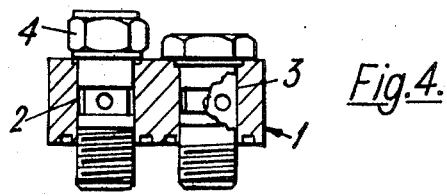
FIG. 4 is a section taken on the plane indicated by line 4—4 of FIG. 2.

Although various methods can be used to manufacture the stabilizer assembly 20, it has been found to be particularly convenient to use the construction shown in FIGS. 2, 3 and 4. Chamber 2 is formed by a through hole in the housing 1 into which a double-ended screw connector 4 is inserted. The other chambers may either be formed in a similar manner with one end of the screw connector closed off or may be formed by drilling blind holes into which are inserted one-ended screw connectors. The passages between chambers are conveniently drilled through the sides of the housing at positions where the check valves will be inserted.

It will be appreciated that the invention illustrated and described herein may be modified by those skilled in the art without deviating from the spirit and scope of the invention as set forth in the following claims.

I claim as my invention:

1. An isolating system for fluid pressure springs comprising: at least two fluid pressure springs, a supply conduit connected to each of the fluid pressure springs by first parallel conduits having check valves therein, and a discharge conduit connected to each of the fluid pressure springs by second parallel conduits having check valves therein, whereby fluid under pressure may be supplied to or removed from the fluid pressure springs while cross over flow of fluid between the springs is prevented under all conditions.

2. A level control system for vehicles comprising; two fluid pressure springs each acting between one side of a vehicle axle and the body of the vehicle, a supply conduit, a discharge conduit, first parallel conduits each having check valve therein connecting the supply conduit to each fluid pressure spring, second parallel conduits each having a check valve therein connecting each fluid pressure spring to the discharge conduit, and means for controlling the flow of fluid in the supply and discharge conduits whereby the vehicle may either be raised by supplying fluid under pressure to the fluid pressure springs or lowered by removing fluid from the fluid pressure springs while cross over flow between the fluid pressure springs is prevented under all conditions.

3. The level control system of claim 2 wherein the means for controlling flow in the supply and discharge conduits comprise a pump, a reservoir and a level regulator between the pump and the reservoir connected to the supply and discharge conduits, the level regulator controlling the flow in the supply and discharge conduits as a function of the difference between a preset road clearance and the actual road clearance to maintain the preset road clearance.

4. The level control system of claim 2 wherein the four check valves are mounted in a housing having a first chamber connected to the supply conduit, a second chamber connected to the discharge conduit, a third chamber connected to a conduit leading to one of the fluid pressure springs and a fourth chamber connected to a conduit leading to the other fluid pressure spring, two of the check valves being in parallel conduits leading from the first chamber to the third chamber and to the fourth chamber and the other two check valves being in parallel conduits leading from the third chamber and from the fourth chamber to the second chamber.

5. The level control system of claim 3 wherein the four check valves are mounted in a housing having a first chamber connected to the supply conduit, a second chamber connected to the discharge conduit, a third chamber connected to a conduit leading to one of the fluid pressure springs and a fourth chamber connected to a conduit leading to the other fluid pressure spring, two of the check valves being in parallel conduits leading from the first chamber to the third chamber and to the fourth chamber and the other two check valves being in parallel conduits leading from the third chamber and from the fourth chamber to the second chamber.